(12) United States Patent  
Rush

(10) Patent No.: US 8,256,958 B2  
(45) Date of Patent: Sep. 4, 2012

(54) TAMPER EVIDENT PHARMACEUTICAL POUCH

(76) Inventor: Ryan Rush, Lutherville, MD (US)

( * ) Notice: Subject to any disclaimer, the term of this patent is extended or adjusted under 35 U.S.C. 154(b) by 355 days.

(21) Appl. No.: 12/583,353

(22) Filed: Aug. 19, 2009

(65) Prior Publication Data

US 2011/0045220 A1     Feb. 24, 2011

(51) Int. Cl.
*B65D 33/10* (2006.01)
*B65D 33/14* (2006.01)
*B65D 33/24* (2006.01)
*B65D 30/08* (2006.01)

(52) U.S. Cl. .............. 383/9; 383/5; 383/10; 383/84; 383/116

(58) Field of Classification Search ........... 383/5, 84, 383/9, 116, 10
See application file for complete search history.

(56) References Cited

U.S. PATENT DOCUMENTS

| | | | |
|---|---|---|---|
| 5,013,290 A * | 5/1991 | DeMatteis | 493/196 |
| 5,931,581 A * | 8/1999 | Garber et al. | 383/9 |
| 6,186,934 B1 * | 2/2001 | Addison | 493/226 |
| 2006/0204148 A1 * | 9/2006 | Kohn | 383/9 |
| 2007/0267319 A1 * | 11/2007 | Farley et al. | 206/554 |

FOREIGN PATENT DOCUMENTS

| | | | | |
|---|---|---|---|---|
| JP | 11029155 A | * | 2/1999 | |
| JP | 2001039448 A | * | 2/2001 | |
| JP | 2002019805 A | * | 1/2002 | |
| JP | 2003072776 A | * | 3/2003 | |
| JP | 2003072777 A | * | 3/2003 | |

\* cited by examiner

*Primary Examiner* — Jes F Pascua
(74) *Attorney, Agent, or Firm* — Ober, Kaler, Grimes & Shriver; Royal W. Craig

(57) ABSTRACT

A tamper evident product distribution pouch especially well-suited for pharmaceuticals is provided, which is made from a single sheet of folded and sealed flexible plastic in a simplified folding and heat-sealing operation that reduces manufacturing steps. The tamper evident pharmaceutical pouch includes a header containing an arrangement of mounting holes and a slot for use as a handle. A pouch is formed by folding over the sheet of material and heat sealing the edges along the length of the pouch. The opening of the pouch adjacent the header. This opening is covered by a flap that extends down from the header over the opening. The flap is not sealed along the edges and can be completely pivoted away from the opening. Adhesive is placed on the flap that contacts the front of the pouch to close and seal the pouch opening.

3 Claims, 6 Drawing Sheets

Prior Art

TAMPER EVIDENT PHARMACEUTICAL POUCH

BACKGROUND OF THE INVENTION

1. Field of the Invention

The present invention relates to sealable tamper evident plastic packaging and processes for making them.

2. Description of the Background

Packages made from single or multiple layers of a plastic or polymer material such as polyethylene, nylon or polyester, include arrangements for envelopes or mail packages that are used for the shipping of documents and objects via the U.S. mail or an overnight courier. These shipping packages or pouches are made from a single sheet of material that is folded upon itself and sealed along the edges to form a pouch. One end of the pouch is open, and one portion of the folded material is longer than the other to create a flap for closing over the open end of the pouch. Adhesive is provided on the pouch where the flap overlaps the side of the pouch to seal the pouch closed. These pouches, however, lack handles to facilitate carrying the pouch, or holes to facilitate mounting the pouch on a stand or post for storage or loading of the pouch. It is difficult to add handles or mounting holes to packages made from single (one or multiple-layer) sheet of plastic.

To illustrate, a prior attempt at a flexible sealable pouch is illustrated in FIGS. 1-3. A single sheet of flexible plastic material 100 is provided. On one side of the sheet 100 an adhesive strip 102 is attached. As seen in FIG. 3, the adhesive strip includes a tacky contact adhesive 302 covered by a removable plastic strip 304 that prevents adhesive sealing until the plastic strip is removed. In FIG. 1, the sheet of material has a top edge 110 and a bottom edge 108. A first fold line 104 is provided near the top edge, and a second fold line 106 is provided generally in the center of the sheet. Folding the sheet of material across the first fold line 104 and bonding the overlapping areas of material together along a bonding line 206 creates a header section 208. The first fold line 104 defines the top of the header. The entire side edges of the header 210 along the entire overlapping length and all the way to the overlapped top edge 110 of the header are heat sealed. A portion of the overlap 310 extends partially over the adhesive strip 102.

The sheet of material is then folded over the second fold line 106 and heat sealed along the entire length of both side edges 210. This forms a pouch area 212 having a front 306 and a back 308. The bottom edge 108 of the sheet is now at the opening of the pouch area 212. The tacky contact adhesive 302 is bonded to the inside surface of the back 308 of the pouch area 212. The front 306 of the pouch area overlaps most of the adhesive strip 212; however the flap portion 310 from the top fold is between the front 306 and the adhesive strip near the open edge 108. In use, the pouch front is pulled away from the back, and the desired contents are inserted into the pouch. To seal, both the pouch front 306 and top flap 310 have to be pulled away from the adhesive strip 102 to remove the plastic covering strip 304. The top flap has to be sealed against the adhesive 102 followed by the pouch front. This is a difficult procedure that is further complicated when the pouch contains large or bulky items. In addition, the top edge or opening 108 of the pouch is not in contact with the adhesive, making is possible for this edge to become hooked or snagged or creating handling problems. In addition, these pouches lack handles to facilitate carrying the pouch, or holes to facilitate mounting the pouch on a stand or post for storage or loading of the pouch. This is important in the pharmaceutical context because pharmacists need a convenient dispenser for the bags while filling them with prescriptions, and dropping the bag can rupture the contents. It is difficult to add handles or mounting holes to packages as above made from single (one or multiple-layer) sheet of plastic. Therefore, a plastic tamper evident pharmaceutical pouch is desired that overcomes these limitations.

SUMMARY OF THE INVENTION

A flexible plastic pouch, for example a tamper evident pharmaceutical pouch, is provided that is made from a single sheet of folded and sealed flexible plastic. The tamper evident pharmaceutical pouch includes a header containing an arrangement of mounting holes and a slot for use as a handle. A pouch is formed by folding over the sheet of material and heat sealing the edges along the length of the pouch. The opening of the pouch is adjacent the header. This opening is covered by a flap that extends down from the header over the opening. The flap is not sealed along the edges and can be completely pivoted away from the opening. Adhesive is placed on the flap that contacts the front of the pouch to close and seal the pouch opening.

DETAILED DESCRIPTION

Figure 1:
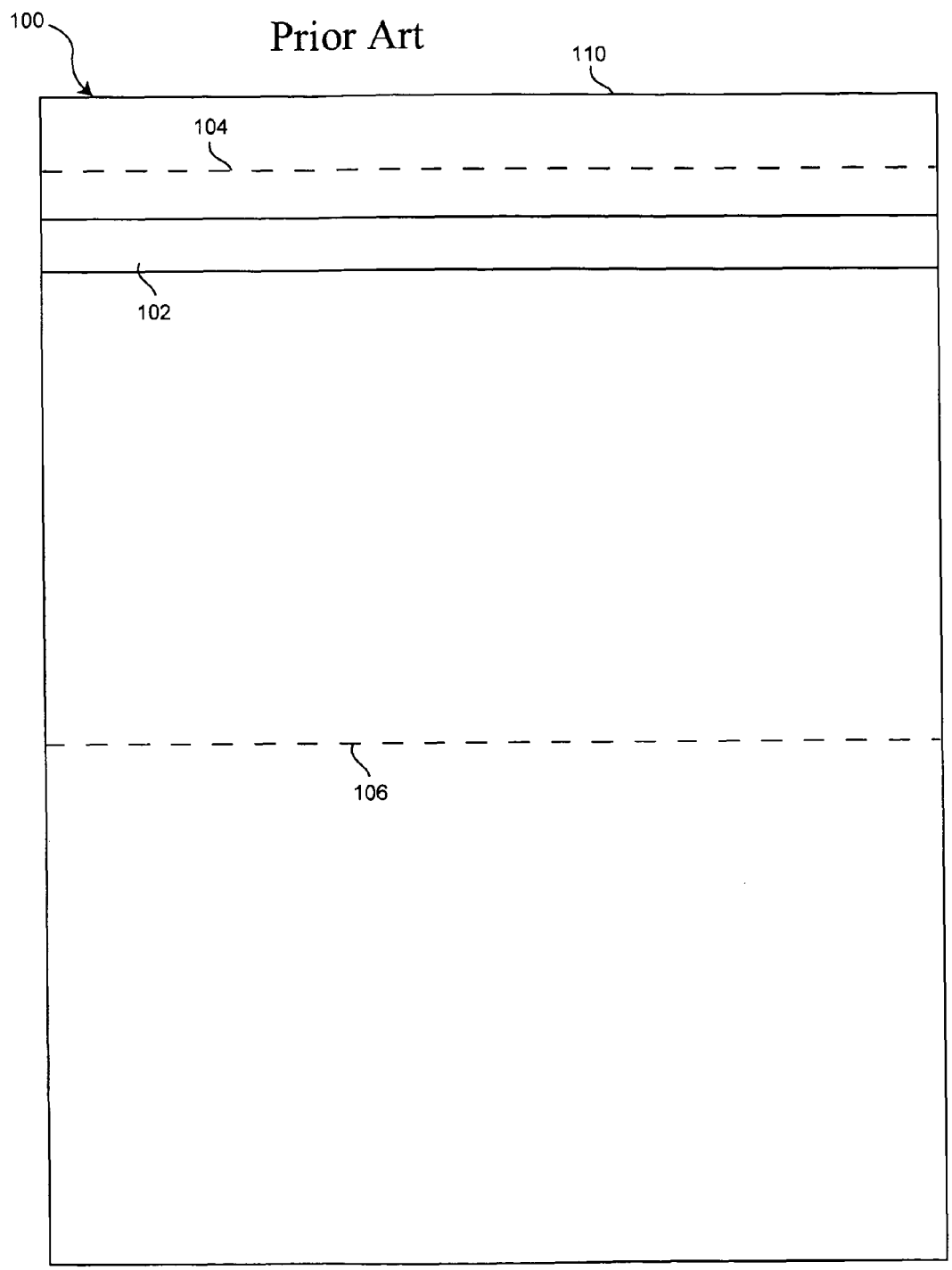
FIG. 1 is plan view of a sheet of flat sheet of material for use in a prior art shipping pouch.
Figure 2:
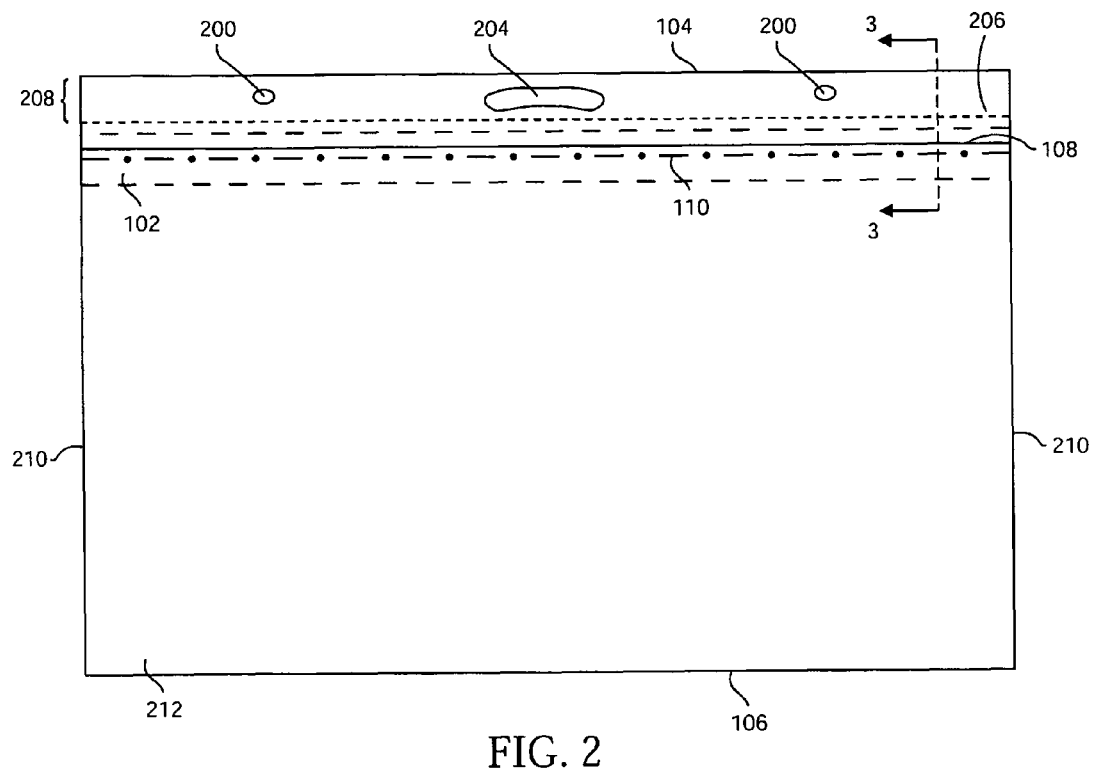
FIG. 2 is a plan view of the sheet of material of FIG. 1 in a folded position.
Figure 3:
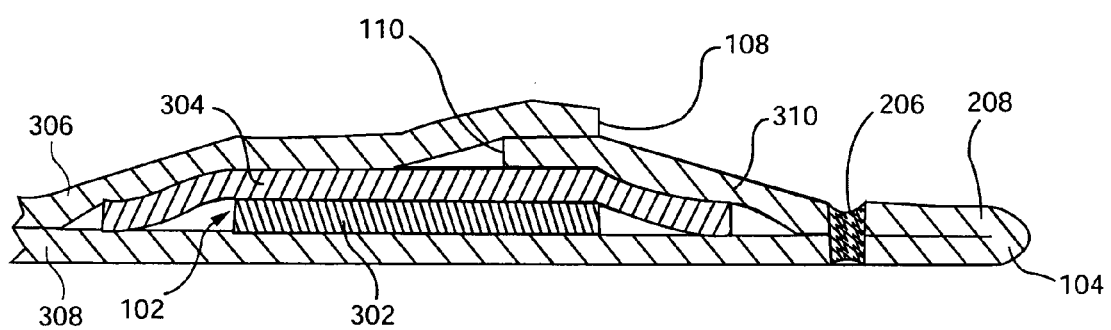
FIG. 3 is a view through line 3-3 of FIG. 2.
Figure 4:
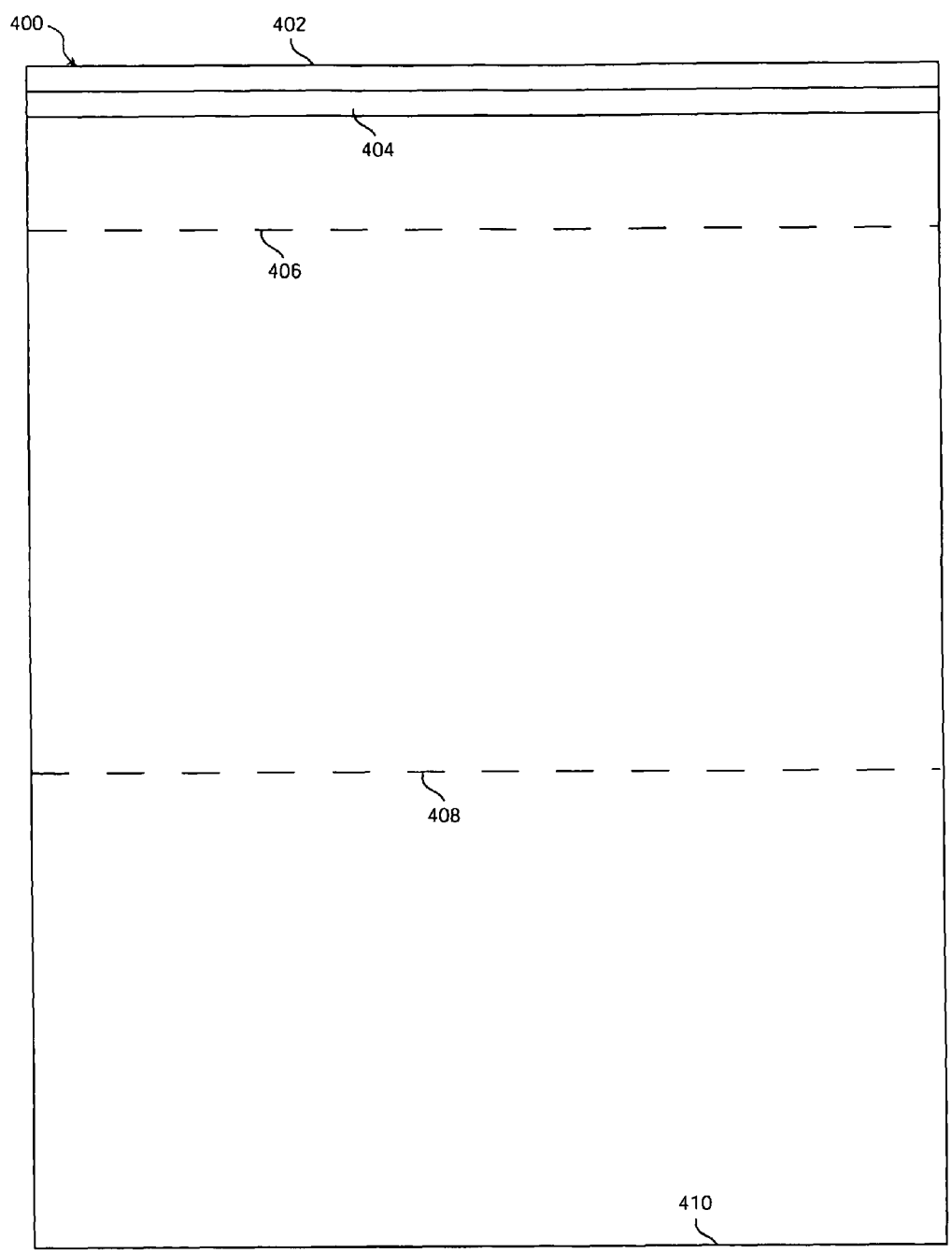
FIG. 4 is a plan view of an embodiment of a sheet of material used in a tamper evident pharmaceutical pouch in accordance with the present invention.
Figure 5:
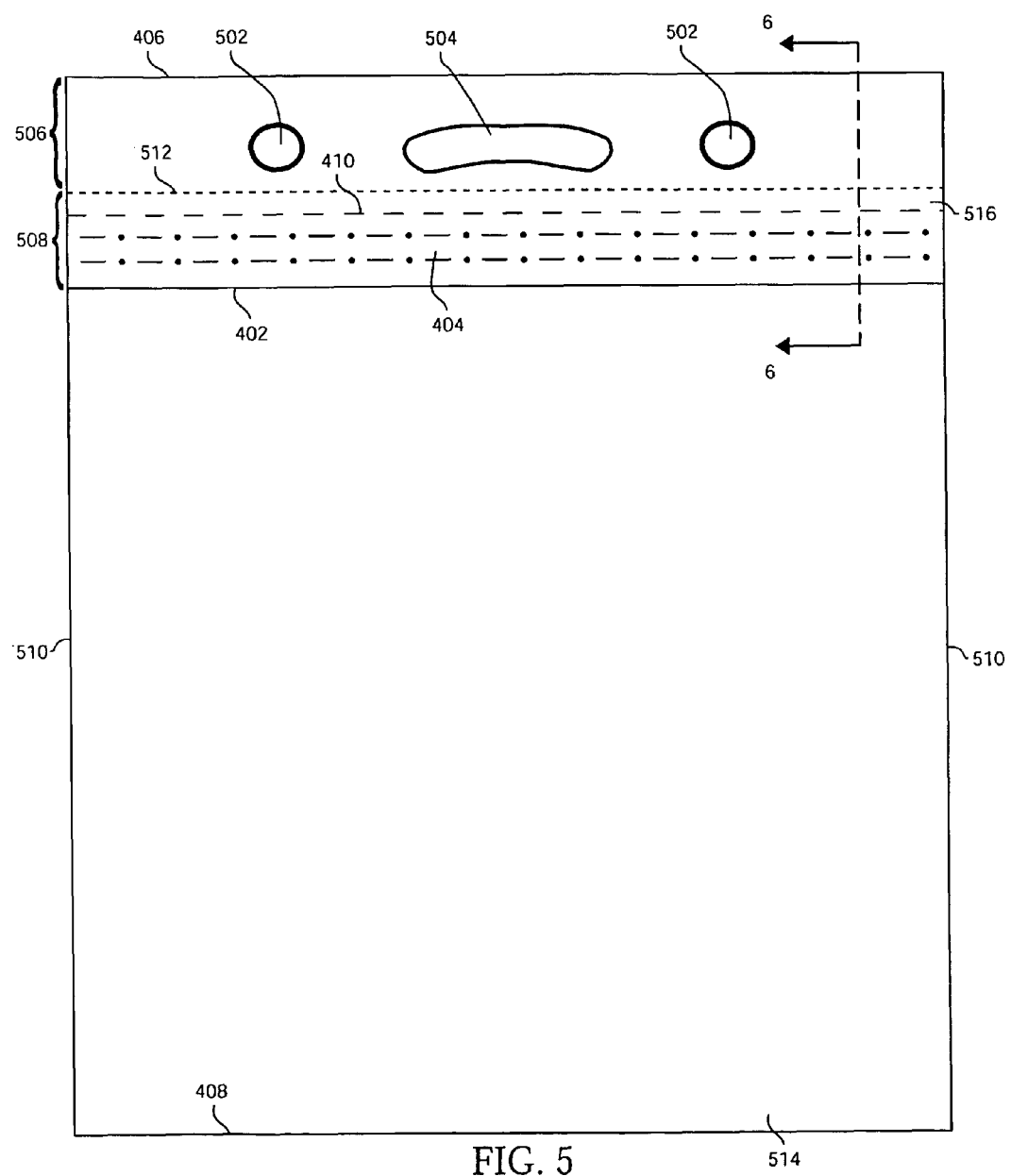
FIG. 5 is a plan view of the sheet of material of FIG. 4 in a folded position.
Figure 6:
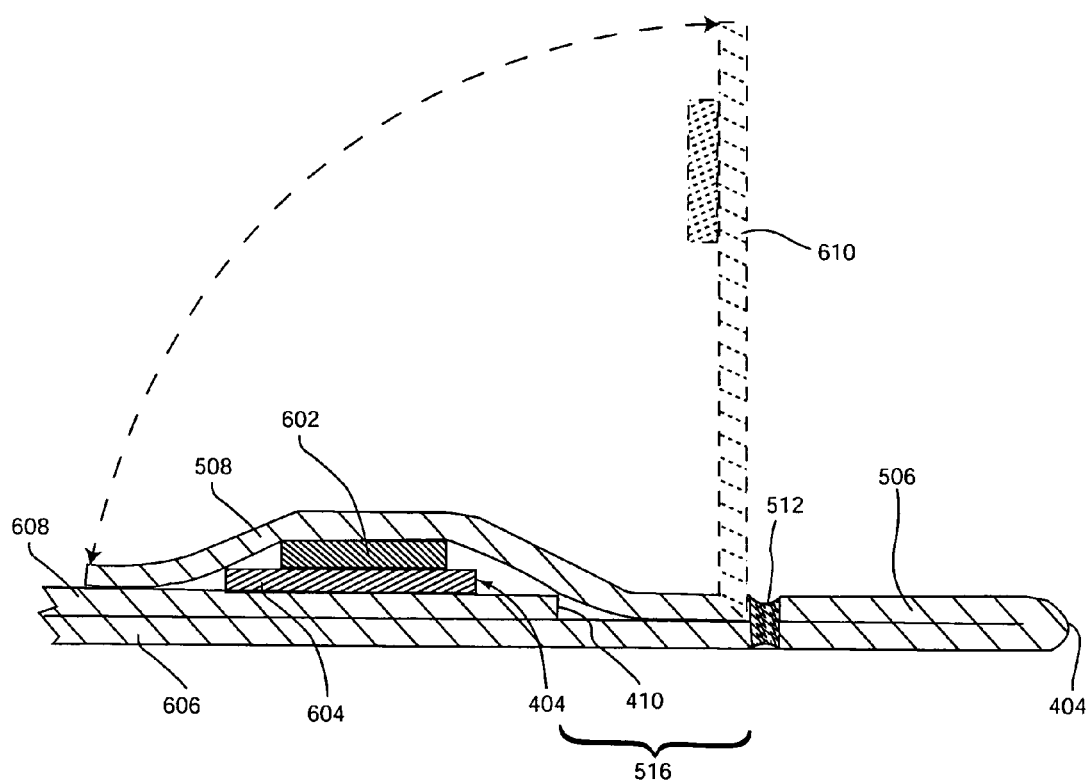
FIG. 6 is a view through line 6-6 of FIG. 5.

Referring to FIGS. 4-6, an exemplary embodiment of a tamper evident pharmaceutical pouch is illustrated which is formed from a single sheet of material in accordance with the present invention. A single sheet of a single or double layer of flexible plastic 400 material is provided. Preferably, plastic sheet 400 is a double-layer of heat sealable polyethylene, either high-density polyethylene (HDPE) or L.D.P.E/L.L-.D.P.E or L.D.P.E./H.D.P.E film. In the preferred embodiment an outer layer of L.D.P.E. and an inner layer of H.D.P.E is used, the latter for its superior tear resistance and chemical-resistance barrier. The two layers are laminated together. The inner layer is preferably opaque black to mask the contents, and the outer layer may be color-coded as per customer requirements, preferably in a lighter color to provide for the writing of information on the exterior of the pouch or the printing of labels or other courier specific information. However, the 2-layer sheet of material can also be transparent or translucent in whole or in part. The sheet of material is rectangular in shape and can be any size that is suitable for the items to be shipped. In one embodiment, the sheet of material is about 12 to about 14 inches wide and about 34 to about 37 inches long, i.e., about 3 feet. This provides for a pouch that is about 2 feet long. Although preferably a multi-layer sheet or laminate a single layer of material will also suffice.

The sheet of material 400 includes a top edge 402 and a bottom edge 410 opposite the top edge. Two fold lines are provided in the sheet, a first fold line 408 and a second fold line 406. A strip of adhesive 404 runs the width of the sheet between the second fold line 406 and the top edge 402. Preferably, the adhesive strip runs adjacent the top edge. Although illustrated as a single strip, the sheet of material can include a plurality of adhesive strips. The adhesive strip 404 includes a permanent (aggressive) adhesive 602 bonded to the sheet of material and a removable release strip 604 to protect the adhesive 602 until application. Suitable adhesives and covering strips are known and available in the art.

During manufacturing, the sheet of material 400 is folded along the first fold line 408 to form a pouch section 514 having a front 608 and a back 606. The first fold line becomes the bottom edge of the pouch, and the bottom edge 410 of the sheet of material becomes the opening of the pouch section. The pouch section 510 is then heat-sealed along the entire length of both sides 510 to just below the dispenser holes 650/arch opening 652 to the marker line indicated at (A).

The sheet of material is then folded along the second fold line 406, and at least one bond or seal line is created across the width of the material at the second fold line 406. The preferred method for creating the seal line is heat sealing, though adhesive bonding is possible. As seen in FIG. 5, the second fold line 406 is now sealed along seal line 512 and thereby defines a header section 506 and a flap section 508 extending from the header section over the pouch section. The edges of the pouch 510 along the header section are also completely heat sealed all the way down to the second fold line 406 (which is also now sealed).

Two circular dispenser holes each having a diameter of about 0.75 inches for accepting two dispenser posts, are cut into the header section below the second fold line 406, and an elongated and arch opening for accepting a hand is cut into the header section between the mounting holes below the second fold line. These features are cut in both overlying layers, effectively forming (as seen in FIG. 4) mirror images with one cut. Two circular dispenser holes 650, each having a diameter of about 0.75 inches for accepting two dispenser posts, appear below the second fold line 406, and an elongated and arch opening 652 for accepting a hand is cut between the mounting holes 650 below the second fold line 406. The mirror images including holes 550 and arch opening 552 are formed above the second fold line 406. The overlying pairs of dispenser holes 550/650 and arch openings 552/652 of FIG. 4 line up and form a proper arrangement of mounting holes 502 and handles 504 as shown in FIG. 5. The opening of the pouch section 410 extends just short of the seal line 512, leaving a gap 516 of between about 0.25 and about 0.5 inches. This gap facilitates opening the pouch section 410 and inserting of pharmaceuticals or other objects.

In the illustrated embodiment, the flap 508 that overhangs the pouch section 410 is about 1.5-2 inches long, sufficient such that the entire adhesive portion 602 of the adhesive strip 404 spans the outer surface of the front of the pouch section. The flap 508 is not bonded along the edges and can, therefore, pivot to an open position 610 (FIG. 6) that exposes the pouch section opening. The seal line 512 is the pivot point of the flap, and the flap can be pivoted to the point that it lays flat over the header section (not shown). The removable strip 604 of the adhesive layer is easily removed when the flap is pivoted to the open position, leaving the adhesive that is bonded to the flap exposed. The exposed adhesive will not contact other undesired surfaces of the pouch, and the flap is easily pivoted back into a closed position to seal the pouch section. As illustrated, the adhesive is spaced about 0.5 to 0.75 inches from the flap 508 edge to provide for a surface to grip to open the pouch. However, the adhesive can also be run substantially along the edge of the flap.

In accordance with the present invention, and to facilitate economy of manufacture, the edges of the pouch 510 along the header section are heat sealed down to the seal line 512 at the same time that the pouch section 510 is heat-sealed along the entire length of both sides 510. This can then be done in one heat-sealing operation rather than two, yet this is subtly difficult to do without sealing the edges of the flap section 508, which bears the adhesive strip 404 and must pivot freely. The edges of the flap section 508 are inline with the sides of pouch section 510 and would otherwise be heat sealed along with pouch section 510. Nevertheless, it is possible to seal the edges of the header section 506 at the same time as the pouch section 510 without sealing the edges of the flap section 508 by inserting non-bonding spacers between the flap section and the sheet of material during heat sealing, so that the flap will not be bonded to the material.

As a less preferable alternative, the width of the flap section can be decreased slightly, for example by cutting the edges of the flap, so that the edges of the flap are not in contact with the heated surfaces or adhesives used in edge bonding. In another embodiment, the edges of the header section and flap section are both bonded, and the edges of the flap section are subsequently de-bonded or cut to remove the bonding.

Given the foregoing construct and method of fabrication, a pharmacist need only fill the tamper evident pharmaceutical pouch with desired contents, peel the release strip 604 and permanently bond the flap via adhesive 602, then remove the pharmaceutical pouch from its hanging dispenser and carry it to the delivery truck. The procedure is simple even when large or bulky items are deposited, and there are no exposed edges to become hooked or snagged and create handling problems. In addition, the above-described pouch includes reinforced (two-ply) handles to facilitate carrying, and holes to facilitate mounting the pouch on the dispenser. Most importantly, only a single vertical heat seal along the edges of the pouch 510 along the header section and pouch section 510 is required and manufacturing is simplified.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A flexible plastic pouch comprising:
   a sheet of material comprising a double-layer of laminated HDPE/LDPE flexible plastic having a layer of LDPE plastic laminated to a layer of black opaque HDPE plastic;
   a first overlap of the sheet of material defining a pouch section with two exterior LDPE layers sandwiching two interior black opaque HDPE layers, the pouch section including, an opening, heat-sealed edges along two opposite sides of the rectangular sheet bonding the two exterior LDPE layers and two interior black opaque HDPE layers together, and a sealed bottom comprising a first fold in the sheet of material; and
   a second overlap section of the sheet of material comprising a header section including, a sealed top opposite the sealed bottom that comprises a second fold in the sheet of material and a first heat seal line along the second fold, heat-sealed edges along two opposite sides running perpendicular from said first heat seal line, a second heat-seal line offset from said first heat seal line and running perpendicular from said heat-sealed edges generally parallel to the opening, a pair of opposing holes cut through the second overlap section entirely through the overlapped sheet of material and an arcuate handle cut through the second overlap section entirely through the overlapped sheet of material between the opposing holes, said holes and handle being contiguously bounded by said first heat seal line, second heat seal line and heat-sealed edges; and a rectangular flap extending from the second seal line over the opening, the rectangular flap including, a first edge hinged to the second seal line, second and third edges corresponding to the two opposite sides of the sheet of material, the second and third edges separate from and never bonded to the opposites sides of the sheet of material, a fourth edge opposite the first edge, and a permanent adhesive strip arranged to secure the rectangular flap over the opening.

2. The flexible pouch according to claim 1, wherein said sheet of material is between 12 to 14 inches wide and between 34 to 37 inches long.

3. The flexible pouch according to claim 1, wherein said adhesive strip comprises a permanent adhesive bonded to said sheet of material and a removable release strip to protect the adhesive until application.

* * * * *